Oct. 4, 1949.　　　　O. JACOBSEN　　　　2,483,544
LUBRICATION FITTING
Filed Jan. 26, 1945
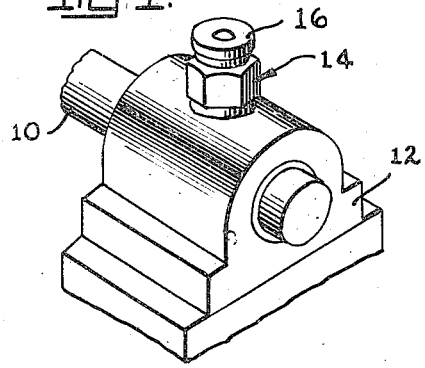
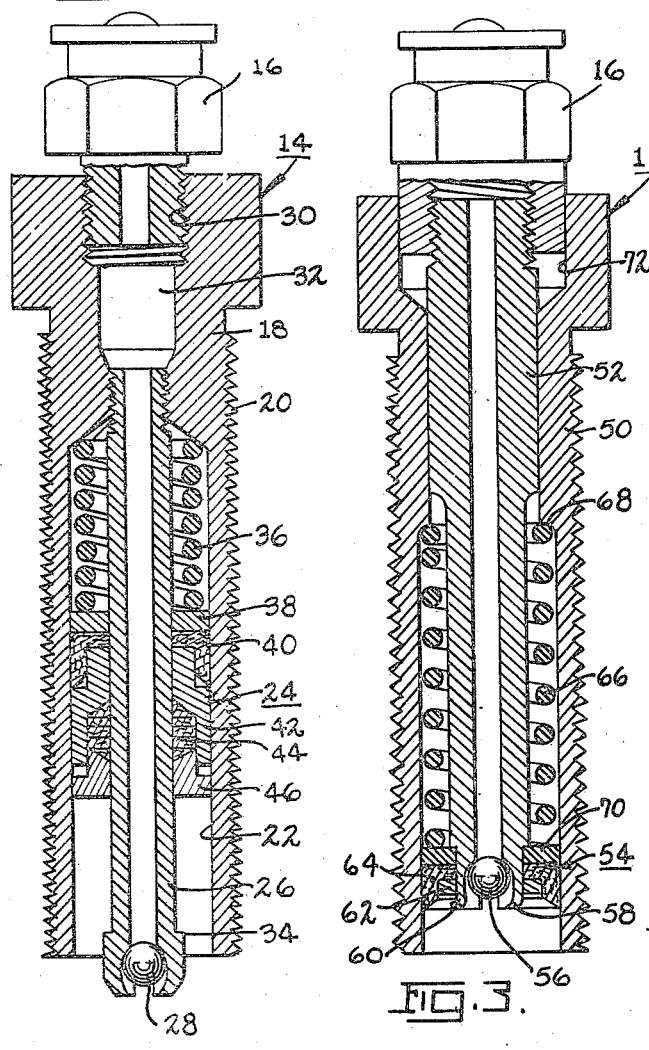
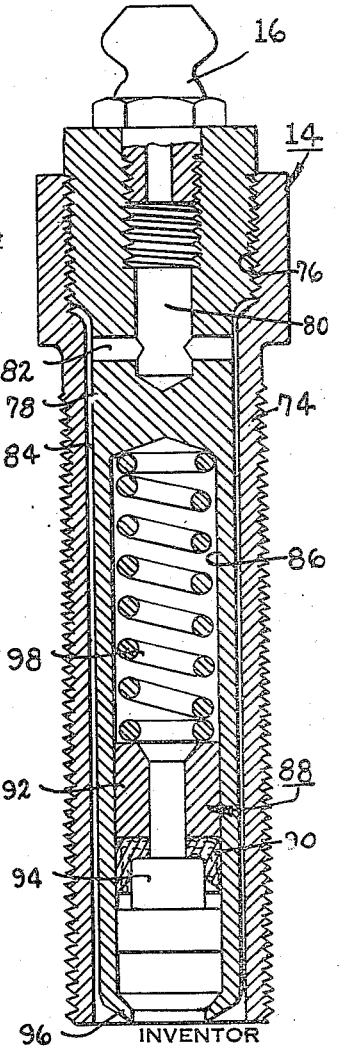
INVENTOR
OYSTEIN JACOBSEN,
BY
Toulmin & Toulmin
ATTORNEYS Patented Oct. 4, 1949

2,483,544

UNITED STATES PATENT OFFICE 2,483,544

LUBRICATION FITTING

Oystein Jacobsen, Montgomery County, Ohio, assignor to The Duriron Company, Inc., Dayton, Ohio, a corporation of New York Application January 26, 1945, Serial No. 574,686

1 Claim. (Cl. 184—45)

This invention relates to lubricating fittings and, especially, to pressure lubricating fittings.

It is an object of this invention to provide a lubricating fitting especially adapted for being received in bearing boxes or journals for supplying thereto grease or oil or similar lubricating medium at a pressure.

It is another object to provide a lubricating fitting of the aforementioned type which is adapted for receiving and storing a quantity of the said lubricant.

It is still another object to provide a pressure grease fitting adapted to store a quantity of lubricant and which is provided with means for indicating the amount of lubricant within the said fitting.

It is another object to provide a lubricating fitting which includes yielding means for continuously discharging the lubricant into the bearing box or journal to which the fitting is attached.

It is another object to provide a lubricant fitting which is substantially leak proof so that it may be used in connection with corrosive or explosive devices.

These and other objects and advantages will become more apparent upon reference to the accompanying drawing, in which:

Figure 1 is a perspective view showing a shaft journal having associated therewith a lubricant fitting according to this invention;

Fig. 2 is a vertical section through one form of a lubricant fitting according to this invention;

Figure 3 is a vertical section through a modified form of lubricant fitting which is adapted to serve as an indicator for the quantity of lubricant yet to be discharged; and Figure 4 is a section through still another modified form of lubricant fitting.

Referring to the drawing in detail, 10 indicates a shaft which is journalled in a bearing block 12 which may include any suitable type of journal.

Inserted in the block 12 is a fitting 14 which includes a grease gun fitting or check valve at 16 through which grease or oil is inserted into the fitting 14.

Referring to Figure 2, the fitting 14 will be seen to comprise a hollow sleeve 18 which is externally and uniformly threaded as at 20 and which has a bore 22 adapted for receiving a piston 24. It is to be noted that part 20 is detachably secured within the bearing block throughout its uniform external diameter. The upper end of the bore 22 is reduced in size and screw threadedly receives the end of a tube 26 which has a ball check valve 28 at the lower end thereof.

The check valve or grease gun fitting 16 is threaded into a bore 30 at the upper end of the fitting 14 and communicates by a passage 32 with the open upper end of the tube 26. Thus, grease or oil which is forced through the fitting 16 passes through the bore 32 and the tube 26 into the space below the piston 24. It is to be noted that the ball check valve 28 acts to prevent the flow of lubricant from the space below the piston 24 upwardly in the tube 26.

The piston 24 is adapted to slide on the tube 26 and is stopped at its lowermost point of travel by a shoulder 34 on the end of the said tube. A spring 36 bears between the upper end of the bore 22 and the upper surface of the piston 24 and urges the latter downwardly.

The piston 24 comprises an upper washer 38, a formed packing at 40, and a lower member 42 which is bored to receive the packing 44 and packing gland 46.

In Figure 3 is illustrated a somewhat modified construction in which the fitting 14 comprises the externally threaded sleeve 50 within which is reciprocable the hollow member 52 which carries at its lower end the piston 54. The lower end of the member 52 is provided with the ball check 56, the ball being retained in position by the staked ends 58 of the member 52. The member 52 also has the outwardly bent end portion 60 which retains the washer 62 against the formed packing 64 of the piston generally indicated at 54.

A spring 66 bears between a shoulder 68 of the member 50 and the washer 70 which backs up the packing 64. The upper end of the member 52 is threaded to receive the check valve fitting 16 and is adapted to telescope within the bore 72 in the head of the fitting 14. The member 52 together with the check valve 16 serves as a tell-tale to indicate the amount of lubricant beneath the piston 54.

Referring to Figure 4, still another modification is illustrated wherein the fitting 14 comprises the externally threaded member 74 which has an internally threaded bore 76 in the head thereof which receives a member 78 having a threaded bore in the upper end thereof for receiving the check valve fitting 16. The aforementioned bore, indicated at 80, is intersected by a transverse bore 82 which opens into a clearance space 84 between the members 78 and 74.

The member 78 is hollow as at 86 for reciprocably receiving a piston 88 which comprises the formed sealing member 90 which is retained between the portions 92 and 94. The lower end of the member 78 is swaged inwardly as at 96 to retain the said piston assembly within the bore 86. A spring 98 bears between the upper end of the bore 86 and the upper surface of the piston 88 so that the latter is continually urged downwardly.

In operation, any of the various devices herein illustrated may be filled with lubricant through the fitting 16 by any suitable gun or pressure device. When the devices are so filled, the pistons therein move upwardly against the thrusts of their respective springs until the bores within which they reciprocate are filled. Thereafter, the pistons are urged downwardly by their respective springs so as continuously to lubricate the device in which the fittings are employed.

Optionally, the fittings may be removed from the threaded bore in which they are placed and a stick of lubricant inserted therein. The fittings are then replaced in the threaded bores and screwed down against their heads. In this case the threading in of the fittings puts pressure on the stick lubricant and causes it to flow upwardly into the piston bores so that the pistons are urged against their respective springs, to exert a pressure on the lubricant. The fittings are thus adapted for use as force screws which, being provided with a yielding central section, not only force the lubricant into the device but also continuously and progressively supply lubricant over a period of time.

It will be understood that I desire to comprehend within my invention such modifications as may come within the scope of the claim and the invention.

I claim:

In a bearing block, a lubrication fitting comprising an elongated cylindrical member of uniform external diameter substantially throughout having a longitudinal bore therein extending from one end of the member through a part of the length thereof, said member being detachably secured within said bearing block throughout its uniform external diameter, a hollow tube arranged along the axis of said bore and detachably supported by said member so as to define therewith an annular recess open at its outer end, an annular piston reciprocably mounted in said recess, yielding means for continuously urging said piston toward the outer open end of said recess, said member having a shoulder adjacent the inner end of said recess that forms a seat for said yielding means, said member having a second bore in the opposite end thereof communicating with the interior of said tube, a grease fitting in the open end of said second bore, a ball check valve in the end of said tube remote from said grease fitting adjacent the open end of said annular recess to prevent the flow of lubricant from said recess upwardly in said tube, and stop means on said tube for engaging said piston and stopping the same at a predetermined point of movement thereof.

OYSTEIN JACOBSEN.

REFERENCES CITED

The following references are of record in the file of this patent:

UNITED STATES PATENTS

| Number | Name | Date |
| --- | --- | --- |
| 1,387,843 | Fesler | Aug. 16, 1921 |
| 1,441,334 | Fesler | Jan. 9, 1923 |
| 1,454,922 | Fesler | May 15, 1923 |
| 1,613,589 | Waddell | Jan. 11, 1927 |
| 1,620,557 | Jorgensen et al. | Mar. 8, 1927 |
| 1,717,543 | Barricklow | June 18, 1929 |

FOREIGN PATENTS

| Number | Country | Date |
| --- | --- | --- |
| 724,969 | France | Feb. 5, 1932 |